(12) United States Patent
Chen et al.

(10) Patent No.: US 8,834,656 B2
(45) Date of Patent: Sep. 16, 2014

(54) MANUFACTURING METHOD OF POROUS COMPOSITE FILM

(75) Inventors: Chien-Chih Chen, Taoyuan County (TW); Yu-Wei Chang, Taoyuan County (TW); Chia-Yin Yao, Taoyuan County (TW); Jui-Lin Hsu, Taoyuan County (TW); Ming-Cheng Tsai, Taoyuan County (TW)

(73) Assignee: Entire Technology Co., Ltd., Taoyuan County (TW)

(*) Notice: Subject to any disclaimer, the term of this patent is extended or adjusted under 35 U.S.C. 154(b) by 188 days.

(21) Appl. No.: 13/616,001

(22) Filed: Sep. 14, 2012

(65) Prior Publication Data

US 2013/0299060 A1  Nov. 14, 2013

(30) Foreign Application Priority Data

May 11, 2012  (TW) .............................. 101116860 A

(51) Int. Cl.
| B29C 65/02 | (2006.01) |
| B32B 37/16 | (2006.01) |
| B32B 37/20 | (2006.01) |
| B32B 43/00 | (2006.01) |
| C08J 5/22  | (2006.01) |

(52) U.S. Cl.
USPC ........ 156/164; 156/229; 156/309.6; 156/311; 156/324

(58) Field of Classification Search
USPC .............. 156/160, 162, 164, 229, 282, 308.2, 156/309.6, 309.9, 311, 324
See application file for complete search history.

(56) References Cited

U.S. PATENT DOCUMENTS

| 4,257,997 A | * | 3/1981 | Soehngen et al. ............ 264/145 |
| 4,834,838 A | * | 5/1989 | Klowak ........................ 162/109 |
| 4,957,943 A | * | 9/1990 | McAllister et al. ............. 521/64 |
| 5,130,342 A | * | 7/1992 | McAllister et al. ............. 521/61 |
| 5,143,679 A | * | 9/1992 | Weber et al. ............... 264/288.8 |
| 5,217,666 A | * | 6/1993 | Tamaru et al. ................ 264/112 |
| 5,236,963 A | * | 8/1993 | Jacoby et al. .................. 521/92 |
| 5,258,156 A | * | 11/1993 | Kurauchi et al. ............. 264/154 |
| 5,328,760 A | * | 7/1994 | Gillberg-LaForce ...... 428/315.5 |

(Continued)

FOREIGN PATENT DOCUMENTS

| JP | 2002037627 A | * | 2/2002 |
| WO | WO 9801502 A1 | * | 1/1998 |
| WO | WO 2009072373 A1 | * | 6/2009 |

OTHER PUBLICATIONS

English Abstract of JP 2002-307627 (May 14, 2014).*

*Primary Examiner* — Sing P Chan
(74) *Attorney, Agent, or Firm* — Li & Cai Intellectual Property (USA) Office

(57) ABSTRACT

The instant disclosure relates to a manufacturing method of a porous composite film. The manufacturing method includes processing a first porous film and a second porous film and includes the following steps: providing a pressing unit, a film-shaping unit, and a cooling unit; intersecting the first and second porous films at an angle; stacking the first and second porous films in forming a half-finished porous composite film; pressing the half-finished porous composite film by the pressing unit at a temperature T1 and under a tension S1; relieving the pressing force against the half-finished porous composite film thermally by the film-shaping unit at a temperature T2; and maintaining the half-finished porous composite film at a pre-determined tension by the cooling unit at a temperature T3.

8 Claims, 5 Drawing Sheets

(56) References Cited

U.S. PATENT DOCUMENTS

| | | | | |
|---|---|---|---|---|
| 5,560,878 A * | 10/1996 | Dragoo et al. | 264/115 |
| 5,681,302 A * | 10/1997 | Melbye et al. | 604/373 |
| 5,731,074 A * | 3/1998 | Nishiyama et al. | 428/315.9 |
| 5,834,528 A * | 11/1998 | Tanaka et al. | 521/145 |
| 5,858,292 A * | 1/1999 | Dragoo et al. | 264/115 |
| 5,882,518 A * | 3/1999 | Yagi et al. | 210/500.36 |
| 5,910,277 A * | 6/1999 | Ishino et al. | 264/127 |
| 5,968,994 A * | 10/1999 | Hashimoto et al. | 521/143 |
| 6,030,428 A * | 2/2000 | Ishino et al. | 55/486 |
| 6,033,509 A * | 3/2000 | Miyamoto et al. | 156/164 |
| 6,048,607 A * | 4/2000 | Hashimoto et al. | 428/315.5 |
| 6,096,213 A * | 8/2000 | Radovanovic et al. | 210/500.36 |
| 6,181,393 B1 * | 1/2001 | Enomoto et al. | 349/86 |
| 6,497,977 B1 * | 12/2002 | Stone et al. | 429/129 |
| 6,689,421 B2 * | 2/2004 | Patel et al. | 427/245 |
| 6,861,132 B2 * | 3/2005 | Ikeda et al. | 428/317.9 |
| 7,132,151 B2 * | 11/2006 | Rasmussen | 428/182 |
| 7,141,168 B2 * | 11/2006 | Sakamoto et al. | 210/500.36 |
| 7,235,203 B2 * | 6/2007 | Sadamitsu et al. | 264/210.7 |
| 7,407,702 B2 * | 8/2008 | Ohno et al. | 428/317.9 |
| 7,807,287 B2 * | 10/2010 | Kono et al. | 429/144 |
| 7,820,271 B2 * | 10/2010 | Rasmussen | 428/182 |
| 7,942,275 B2 * | 5/2011 | Thottupurathu | 210/500.36 |
| 7,981,536 B2 * | 7/2011 | Kono et al. | 429/144 |
| 8,057,718 B2 * | 11/2011 | Lee et al. | 264/210.1 |
| 8,118,910 B2 * | 2/2012 | Farzana et al. | 95/45 |
| 8,252,450 B2 * | 8/2012 | Takita et al. | 429/144 |
| 8,272,517 B2 * | 9/2012 | Horie et al. | 210/500.36 |
| 8,298,465 B2 * | 10/2012 | Kikuchi et al. | 264/173.15 |
| 8,323,821 B2 * | 12/2012 | Takita et al. | 429/129 |
| 8,414,663 B2 * | 4/2013 | Kimishima | 29/623.1 |
| 8,419,839 B2 * | 4/2013 | Shimatani | 96/12 |
| 8,449,660 B2 * | 5/2013 | Shimatani et al. | 96/11 |
| 8,491,991 B2 * | 7/2013 | Masuda et al. | 428/304.4 |
| 8,663,530 B2 * | 3/2014 | Horie et al. | 264/288.8 |
| 8,695,812 B2 * | 4/2014 | Horie et al. | 210/500.36 |
| 8,709,640 B2 * | 4/2014 | Kikuchi et al. | 429/144 |
| 2001/0023014 A1 * | 9/2001 | Patel et al. | 428/195 |
| 2002/0168398 A1 * | 11/2002 | Delmotte | 424/443 |
| 2003/0148091 A1 * | 8/2003 | Ikeda et al. | 428/317.9 |
| 2004/0058135 A1 * | 3/2004 | Patel et al. | 428/195.1 |
| 2004/0096744 A1 * | 5/2004 | Sadamitsu et al. | 429/254 |
| 2004/0161598 A1 * | 8/2004 | Ohno et al. | 428/315.7 |
| 2004/0170810 A1 * | 9/2004 | Rasmussen | 428/174 |
| 2005/0087487 A1 * | 4/2005 | Sakamoto et al. | 210/500.36 |
| 2006/0228540 A1 * | 10/2006 | Lee et al. | 428/317.9 |
| 2007/0116944 A1 * | 5/2007 | Lee et al. | 428/317.9 |
| 2007/0154699 A1 * | 7/2007 | Hayashi et al. | 428/304.4 |
| 2007/0178324 A1 * | 8/2007 | Masuda et al. | 428/500 |
| 2007/0254120 A1 * | 11/2007 | Rasmussen | 428/35.7 |
| 2007/0257402 A1 * | 11/2007 | Rasmussen | 264/339 |
| 2008/0057388 A1 * | 3/2008 | Kono et al. | 429/144 |
| 2008/0057389 A1 * | 3/2008 | Kono et al. | 429/144 |
| 2008/0246189 A1 * | 10/2008 | Kuzuhara et al. | 264/334 |
| 2009/0117454 A1 * | 5/2009 | Takita et al. | 429/145 |
| 2009/0123822 A1 * | 5/2009 | Takita et al. | 429/129 |
| 2009/0148761 A1 * | 6/2009 | Kikuchi et al. | 429/145 |
| 2009/0226813 A1 * | 9/2009 | Takita et al. | 429/247 |
| 2009/0226814 A1 * | 9/2009 | Takita et al. | 429/247 |
| 2009/0253032 A1 * | 10/2009 | Takita et al. | 429/145 |
| 2009/0269656 A1 * | 10/2009 | Takita et al. | 429/145 |
| 2009/0274955 A1 * | 11/2009 | Kikuchi et al. | 429/144 |
| 2010/0021808 A1 * | 1/2010 | Takita et al. | 429/145 |
| 2010/0206660 A1 * | 8/2010 | Horie et al. | 181/175 |
| 2010/0209745 A1 * | 8/2010 | Kimishima | 429/50 |
| 2010/0242733 A1 * | 9/2010 | Shimatani | 96/12 |
| 2010/0295511 A1 * | 11/2010 | Kikuchi et al. | 320/128 |
| 2011/0112492 A1 * | 5/2011 | Bharti et al. | 604/319 |
| 2011/0114249 A1 * | 5/2011 | Rasmussen | 156/85 |
| 2011/0117439 A1 * | 5/2011 | Yamada et al. | 429/254 |
| 2011/0166243 A1 * | 7/2011 | Kikuchi et al. | 521/134 |
| 2011/0192283 A1 * | 8/2011 | Shimatani et al. | 96/11 |
| 2011/0195295 A1 * | 8/2011 | Manago et al. | 429/145 |
| 2011/0223486 A1 * | 9/2011 | Zhang et al. | 429/247 |
| 2011/0244013 A1 * | 10/2011 | Mrozinski et al. | 424/409 |
| 2012/0088149 A1 * | 4/2012 | Ishihara et al. | 429/207 |
| 2012/0156568 A1 * | 6/2012 | Kia et al. | 429/246 |
| 2012/0189815 A1 * | 7/2012 | Matsui et al. | 428/156 |
| 2012/0273114 A1 * | 11/2012 | Takita et al. | 156/77 |
| 2013/0029126 A1 * | 1/2013 | Yen | 428/221 |
| 2013/0040184 A1 * | 2/2013 | Busch et al. | 429/144 |
| 2013/0052539 A1 * | 2/2013 | Azais et al. | 429/249 |
| 2013/0097982 A1 * | 4/2013 | Inui et al. | 55/495 |
| 2013/0099411 A1 * | 4/2013 | Horie et al. | 264/171.1 |
| 2013/0116355 A1 * | 5/2013 | Kang et al. | 521/143 |
| 2013/0157035 A1 * | 6/2013 | Uehara et al. | 428/220 |
| 2013/0209892 A1 * | 8/2013 | Ogawa et al. | 429/249 |
| 2013/0344375 A1 * | 12/2013 | Brant et al. | 429/145 |
| 2014/0004295 A1 * | 1/2014 | Kiederle | 428/101 |
| 2014/0030468 A1 * | 1/2014 | Kiederle et al. | 428/69 |
| 2014/0087104 A1 * | 3/2014 | Kierderle et al. | 428/35.2 |
| 2014/0094076 A1 * | 4/2014 | Mrozinski et al. | 442/56 |

* cited by examiner

MANUFACTURING METHOD OF POROUS COMPOSITE FILM

BACKGROUND OF THE INVENTION

1. Field of the Invention

The instant disclosure relates to a manufacturing method of a porous composite film; more particularly, to a manufacturing method of a porous composite film used for separating the cathode and anode inside a lithium battery.

2. Description of Related Art

Lithium batteries are batteries that have lithium metal or lithium compounds as an anode. There are two types of lithium batteries: disposable and rechargeable. Because lithium has very high chemical reactivity, the condition for processing, storing, and using lithium is very strict. As a result, lithium batteries have long been neglected for industrial use. However, with the development in microelectronics towards the end of the 20$^{th}$ century, many miniaturized electronic devices are produced. Accordingly, a higher standard is demanded regarding the power source. Lithium batteries thus become more widely demanded.

The first lithium battery for use is developed by Sony in 1992. The usage of lithium batteries allows size reduction for many portable consumer electronic devices such as mobile phones, laptop computers, etc. Plus, lithium cells will provide much longer life. Since lithium batteries do not have cadmium, the lithium batteries are more environmental friendly than nickel-cadmium batteries. Other advantages of lithium batteries include portability, easy to assemble, having high energy density, and negligible amount of noise and gas. These advantages make lithium batteries a popular choice for electronic applications.

Lithium batteries include electrodes, an electrolyte, a separation film, and an outer case. The separation film is disposed between the electrodes to separate the cathode and anode. The purpose is to prevent shorting due to inadvertent chemical interactions between the electrodes. In addition, the separation film has many pores for ions to flow therethrough in forming a conductive passage.

While recharging, dendritic crystal growth of the lithium metal tends to appear on the surfaces of the electrodes. The sharp dendritic crystal structure may penetrate the separation film disposed between the electrodes and cause shorting inside the cell. The shorting of the cell results in thermal runaway and reduces its life cycle. To prevent the aforementioned condition from occurring, the separation film must be strong enough to withstand puncture.

In terms of safety in using lithium batteries, how to increase puncture resistance for the separation film in lowering the likelihood of shorting and thermal runaway is an important topic to be addressed by industrial manufacturers.

SUMMARY OF THE INVENTION

The object of the instant disclosure is to enhance puncture-resistance of the separation film inside a lithium battery. By achieving this object, the lithium battery would be safer to use, with shorting and thermal runaway less likely to occur.

To achieve the above object, the instant disclosure provides a manufacturing method of a porous composite film. The manufacturing method includes processing a first porous film and a second porous film. The first porous film defines a first stretching direction. The first porous film is arranged along the first stretching direction. Similarly, the second porous film defines a second stretching direction. The second porous film is arranged along the second stretching direction. Thus, the porous composite film having a pre-determined tension is formed. Specifically, the manufacturing method includes the following steps: a) providing a pressing unit, a film-shaping unit, and a cooling unit; b) intersecting the first and second stretching directions at an angle; c) stacking the first and second porous films to form a half-finished porous composite film; d) pressing the half-finished porous composite film by the pressing unit at a temperature T1 and a tension S1; e) shaping the half-finished porous composite film by the film-shaping unit under a temperature T2 to thermally relieve the pressing force against the half-finished porous composite film; and f) maintaining the half-finished porous composite film at a pre-determined tension S3 by the cooling unit at a temperature T3. A pair of mathematical expressions are presented herein associated with the abovementioned manufacturing method, namely:

$$1 = \frac{T1+T2+T3}{100} * W1, \quad 0.2 < W1 < 0.5$$

$$1 = \frac{|T2-T1|}{|T3-T1|} * W2, \quad 0.02 < W2 < 16$$

The above described manufacturing method further includes the following step: cooling the half-finished porous composite film until reaching the room temperature by the cooling unit, where the cooling rate is 10~100° C./min.

Furthermore, for the above described manufacturing method, the pressure P1 exerted by the pressing unit on the first and second porous films is 0.01~0.37 kg/cm$^2$.

Moreover, for the above described manufacturing method, the temperature T1 is in the range of 60~140° C., and the temperature T2 is in the range of 100~160° C., where T2−T1=5~50° C.

For the above described manufacturing method, a relieving parameter G is defined by the film-shaping unit, where:

$$\left|\left(\frac{T2-T1}{T1+100}*100-5\right)\right|\% \le G \% \le \left(\frac{T2-T1}{T1+100}*100+5\right)\%;$$

$$1\% \le G \le 32\%$$

For the above described manufacturing method, the tension S1 is in the range of 10~500 kg/cm$^2$. The pre-determined tension S3 increases at a rate of 10~100 kg/cm$^2$ per minute.

Based on the above described manufacturing method, a separation film having greater puncture-resistance for lithium batteries can be provided. The manufactured separation film is also tear-resistant and having suitable pore size for venting.

In order to further appreciate the characteristics and technical contents of the instant disclosure, references are hereunder made to the detailed descriptions and appended drawings in connection with the instant disclosure. However, the appended drawings are merely shown for exemplary purposes, rather than being used to restrict the scope of the instant disclosure.

DETAILED DESCRIPTION OF THE EMBODIMENTS

Figure 1:
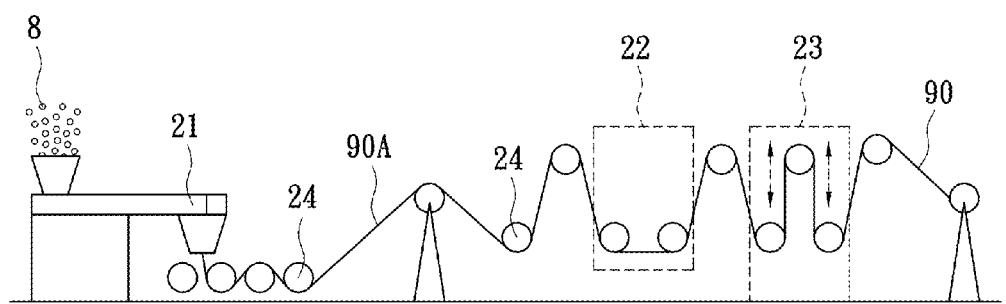
FIG. 1 is a schematic view showing the manufacturing equipments for the precursor film.

Please refer to FIG. 1, which is a schematic view showing some manufacturing equipments of a conventional porous film. Specifically, FIG. 1 shows a hot melt dispensing unit 21, a heat treating unit 22, a stretching unit 23, and a plurality of rollers 24 for manufacturing a porous film 90 for lithium batteries. The pores of the porous film 90 allow electrically charged ions to pass therethrough in forming a conductive passage. Thus, the porous film 90 is typically disposed between the anode and cathode of the lithium battery to separate the electrodes. Because of such arrangement, the porous film 90 is also called "separation film". This porous film 90 represents the precursor film for the manufacturing method of the instant disclosure. Specifically, a polyolefin-based starting material 8 is supplied to the hot melt dispensing unit 21. Heat is added to melt the starting material 8 in forming a membrane-shaped half-finished porous film 90A. The half-finished porous film 90A is transported by the rollers 24 to the heat treating unit 22 and the stretching unit 23 in sequence. Generally, heat is added to the half-finished porous film 90A by the heat treating unit 22, and the stretching unit 23 stretches the half-finished porous film 90A along its travelling direction. The end of the stretching process signals the completion of the finished porous film 90. As previously mentioned, the porous film 90 serves as the conventional separation film for lithium batteries. In particular, the stretching direction generated by the stretching unit 23 is called machine direction, or MD, while the lateral direction crossing the MD is defined as transverse direction, or TD.

Figure 2A:
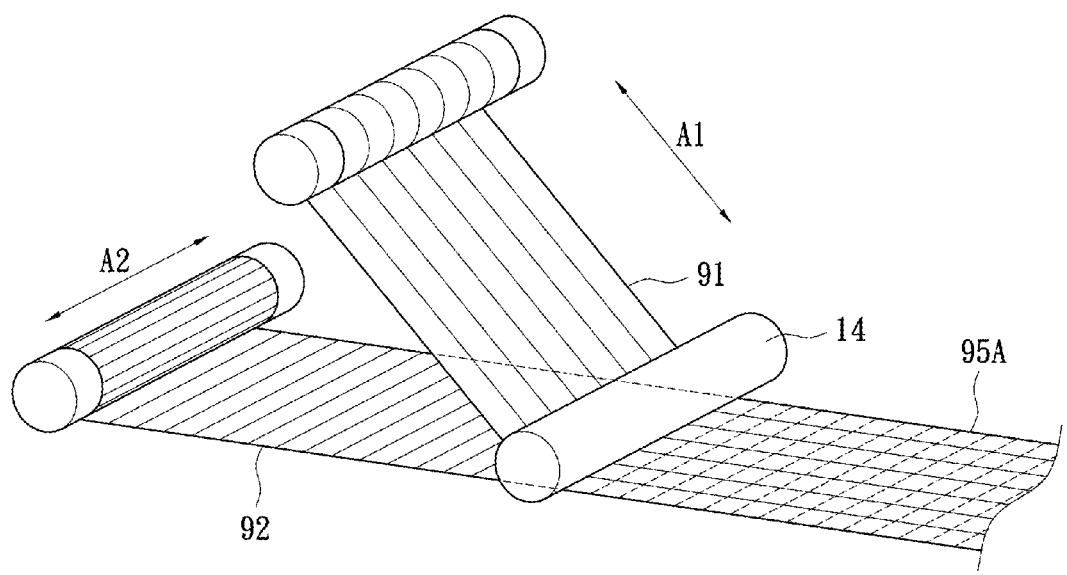
FIGS. 2A and 2B are schematic views of manufacturing equipments for the porous composite film of the instant disclosure.
Figure 2B:
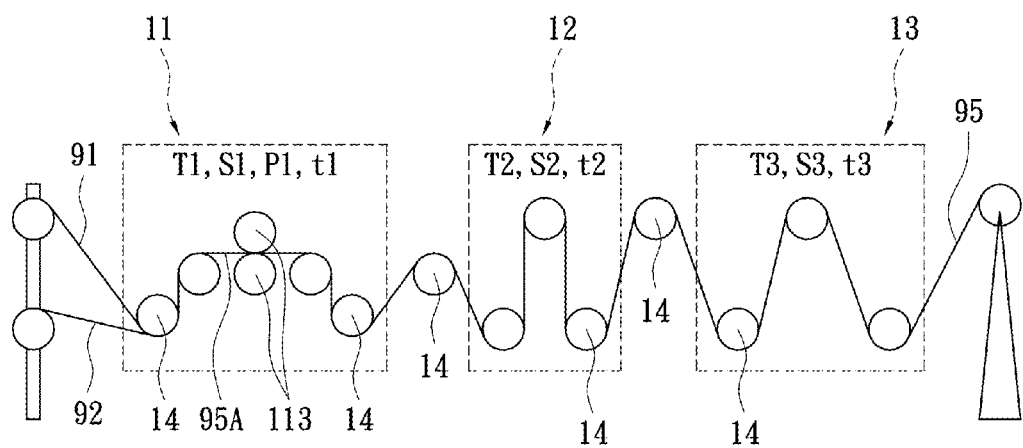
Figure 3:
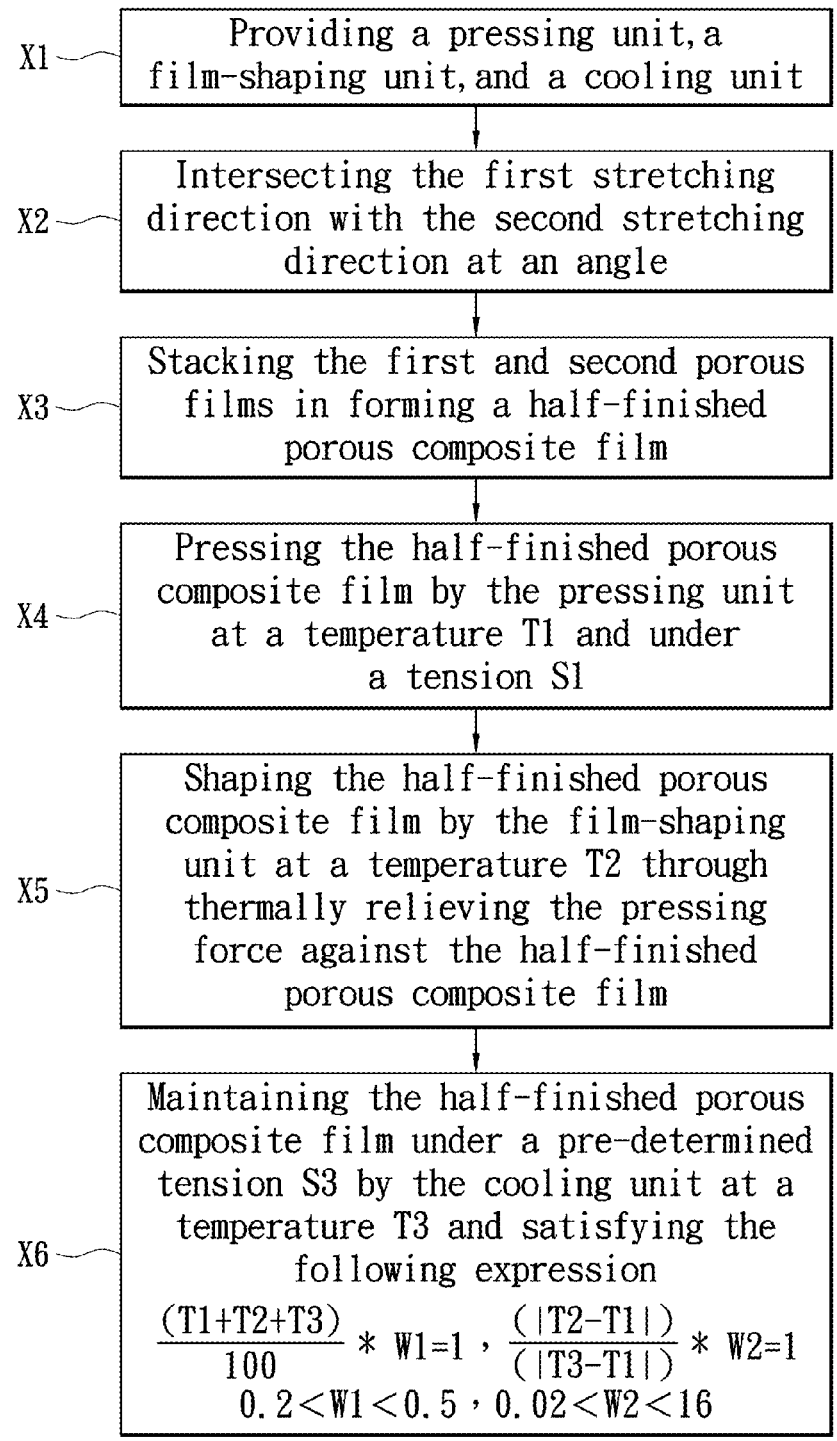
FIG. 3 is a flow chart showing the manufacturing steps of the porous composite film of the instant disclosure.

To address the issue of dendritic crystal growth by the separation film on the anode side in preventing thermal runaway, the instant disclosure provides additional processing steps for the conventional porous film 90 to increase the safety of the lithium battery. In other words, the porous film 90 is additionally processed to enhance its puncture-resistance. By preventing the separation film from being punctured by the dendritic crystal growth, thermal runaway can be avoided. Please refer to FIGS. 2A~3. FIGS. 2A and 2B show the manufacturing equipments for the porous composite film 95 of the instant disclosure, while FIG. 3 shows a flow diagram for the manufacturing method of the porous composite film 95 of the instant disclosure. As shown in FIG. 2A, after a first porous film 91 has been manufactured, a first stretching direction (A1) is defined by the first porous film 91. Similarly, once a second porous film 92 has been manufactured, a second stretching direction (A2) is defined by the second porous film 92. For the manufacturing steps to be described hereinafter, the first stretching direction (A1) is parallel to the subsequent travelling direction of the first and second porous films 91, 92. Thus, the first stretching direction (A1) is the MD. The second stretching direction (A2) intersects the travelling direction of the first and second porous films 91, 92 at an angle. Thus, the second stretching direction (A2) is the TD. As illustrated in FIGS. 2B and 3, the manufacturing method of the porous composite film 95 of the instant disclosure utilizes a pressing unit 11, a film-shaping unit 12, and a cooling unit 13 for implementing the processing procedure (step X1). Before the porous film 90 is processed by the pressing unit 11, the first stretching direction (A1) and the second stretching direction (A2) intersects each other at an angle (step X2). Typically, the angle is approximately 90 degrees. Next, a plurality of rollers 14 is utilized for stacking the first and second porous films 91, 92 in forming a half-finished porous composite film 95A (step X3).

Then, for a temperature T1 and under a tension S1, the half-finished porous composite film 95A is pressed by the pressing unit 11 (step X4). Thus, the first and second porous films 91, 92 are tightly packed to each other without being easily separated. The temperature T1 is in the range of 60~140° C., more preferably in the range of 80~120° C. Whereas the tension S1 is in the range of 10~500 kgf/cm², more preferably in the range of 30~200 kgf/cm². The pressing time t1 at the temperature T1 and under the tension S1 is in the range of 0.1~10 sec. Preferably, the pressing unit 11 heats the half-finished porous composite film 95A by convective or microwave heat transfer. Moreover, the first and second porous films 91 and 92 are bonded by the pressing unit 11 at a pressure P1. The pressure P1 is in the range of 0.01~0.37 kgf/cm². In addition, the pressing unit 11 also utilizes a pair of compression rollers 113 to implement the pressing operation. The compression rollers 113 may be elastic rollers (e.g., rubber rollers or silicon rollers) or mirror finished rollers.

To examine the effect of temperature T1 and pressure P1 on the "stripping force" of the first and second porous films 91, 92 or the "air permeation time" of the half-finished porous composite film 95A, a verification process is performed based on different combinations (A~I) of temperature T1 and pressure P1. The "stripping force" represents the force necessary to separate the first and second porous films 91, 92. The greater the stripping force, the more difficult to separate the first and second porous films 91, 92. Whereas the "air permeation time" represents the time it takes a given volume of air (100 cc) to flow through the half-finished porous composite film 95A. The time value is used to determine the pore size of the half-finished porous composite film 95A. The experimental results of the verification process is shown hereinbelow:

| Group | Tension S1 (kgf/cm²) | Temp. T1 (° C.) | Pressure P1 (kgf/cm²) | Stripping Force (g) | Air Permeation Time (sec/100 cc) |
|---|---|---|---|---|---|
| (A) | 64.43 | 80 | 0.05 | 7 | 559 |
| (B) | | 80 | 0.34 | 86 | 572 |
| (C) | | 80 | 0.60 | 124 | 864 |
| (D) | 47.62 | 100 | 0.02 | 6 | 584 |
| (E) | | 100 | 0.27 | 71 | 591 |
| (F) | | 100 | 0.75 | 143 | 1322 |
| (G) | 27.32 | 120 | 0.01 | 12 | 569 |
| (H) | | 120 | 0.16 | 158 | 602 |
| (I) | | 120 | 0.55 | 384 | 1586 |

As shown in the above table, for groups A, D, and G, because of the smaller pressures P1, the stripping forces for the first and second porous films 91, 92 are too small, namely in the range of 6~12 g. Meanwhile, for groups C, F, and I, the pressures P1 are too large, such that the air permeation time are too long, namely in the range of 864~1586 sec. In other words, the statistical data indicates the porosity of the half-finished porous composite film 95A for groups C, F and I are too low. Based on past industrial experience, the standard half-finished porous composite film 95A typically has a stripping force greater than 50 g and an air permeation time in the range of 300~700 sec. Based on the parameters T1 and P1, the experimental data suggests the following: the temperature T1 and pressure P1 are inversely related. Therefore, if both the temperature T1 and the pressure P1 take on larger values, the pores are negatively affected. Namely, the decrease in porosity results in an increase of air permeation time for the half-finished porous composite film 95A. On the other hand, if both the temperature T1 and the pressure P1 take on a lesser values, the corresponding stripping force of the first and second porous films 91, 92 decreases (easier to separate).

After the half-finished porous composite film 95A has been pressed, the film-shaping unit 12 is utilized to thermally relieve the pressing force against the half-finished porous composite film 95A at a temperature T2 (step X5). The temperature T2 is less than the melting point of the porous composite film 95. For the instant step, the relieving operation is done by: heating the half-finished porous composite film 95A at a temperature lower than the melting point of the half-finished porous composite film 95A. Based on experiments, the temperature T2 is preferably in the range of 100~160° C., more preferably in the range of 130~150° C. The heating time t2 is in the range of 1~600 sec, more preferably in the range of 20~300 sec. More preferably, the temperature difference between T2 and T1 is in the range of 5~50° C. In other words, T2−T1=5~50° C., and more preferably T2−T1=10~20° C.

To make sure the temperatures T1 and T2 are properly selected for the relieving process, a relieving parameter G is defined to satisfy the following expression:

$$\left|\left(\frac{T2-T1}{T1+100}*100-5\right)\right|\% \leq G\,\% \leq \left(\frac{T2-T1}{T1+100}*100+5\right)\%;$$

The temperature T2 is greater than T1. The relieving parameter G indicates the required relieving force based on the temperature difference between T1 and T2 for the half-finished porous composite film 95A to reduce the shrinking ratio for the finished product. To examine the effect of the relieving parameter G on the half-finished porous composite film 95A, a verification process is conducted based on various temperatures T1 and T2. The results are shown hereinbelow:

| Group | Temp T1 (□) | Temp T2 (□) | Relieving Parameter G (%) | $\left(\frac{T2-T1}{T1+100}*100\right)$ | Shrinking Ratio (%) | Air Permeation Time (sec/100 cc) |
|---|---|---|---|---|---|---|
| 1 | 80 | 110 | 15 | 16.7% | 0.9 | 571 |
| 2 | 80 | 110 | 5 | 16.7% | 6.2 | 762 |
| 3 | 80 | 110 | 30 | 16.7% | 0.6 | 1526 |
| 4 | 100 | 120 | 15 | 10.0% | 1.2 | 612 |
| 5 | 100 | 140 | 20 | 20.0% | 0.8 | 639 |
| 6 | 100 | 160 | 30 | 30.0% | 0.3 | 1430 |
| 7 | 120 | 125 | 19 | 2.3% | 1.8 | 1153 |
| 8 | 120 | 140 | 19 | 9.1% | 1.1 | 968 |
| 9 | 120 | 150 | 19 | 13.6% | 0.8 | 663 |
| 10 | 120 | 160 | 19 | 18.2% | 1.0 | 563 |

As shown in the above table, the temperature difference (i.e., T2−T1) between the pressing unit 11 and the film-shaping unit 12 significantly affects the shrinking ratio and the air permeation time of the half-finished porous composite film 95A. Generally speaking, if over-relieved (i.e., G is too large), the pores will shrink causing the air permeation time to be too long. On the other hand, if under-relieved (i.e., G is too small), the shrinking ratio will be too high during the subsequent heat-resistant test. Thereby, the relieving parameter G should be maintained at a suitable range. For example, as indicated by group 2 shown in the above table, an under-relieved half-finished porous composite film 95A has a shrinking ratio up to 6.2% for the heat-resistant test. In contrast, as indicated by groups 3, 7, and 8, at least 960 seconds are needed for 100 cc of air to flow through an over-relieved half-finished porous composite film 95A. Whereas for group 6, the experimental result shows if the temperature difference between T1 and T2 is too large, the porosity is adversely affected. Therefore, based on the experimental results, if the relieving parameter G is in the range of 1~32%, the shrinking ratio, the air permeation time, and the pores of the porous composite film 95 can be adequately maintained, to achieve optimization. It is worth noting the shrinking ratio of the half-finished porous composite film 95A is in the machine direction.

Figure 4A:
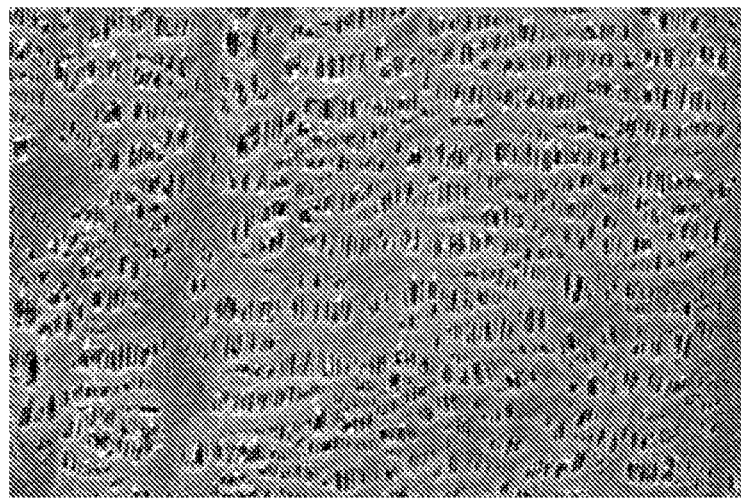
FIGS. 4A and 4B are microscopic images showing the half-finished porous composite film at different temperatures T1 and pressures P1.
Figure 4B:

To further verify the experimental results shown in the above table, the inventors have obtained microscopic images of the half-finished porous composite film 95A for group 1 and 6. These images are presented in FIGS. 4A and 4B. As shown in FIG. 4A, the half-finished porous composite film 95A of group 1 shows distinct fiber-like structures. These fiber-like structures suggest higher porosity, which explains the low air permeation time of 571 seconds (i.e., the time it takes for 100 cc of air to flow through the half-finished porous composite film 95A). In contrary, as shown in FIG. 4B, the fiber-like structures are less visible for the half-finished porous composite film 95A of group 6. Therefore, group 6 has lower porosity, and the corresponding air permeation time is longer at 1430 seconds.

After the half-finished porous composite film 95A have undergone the relieving step, the cooling unit 13 is utilized to cool the half-finished porous composite film 95A at a temperature T3 and under a tension S3 (step X6). The cooling process is terminated when the half-finished porous composite film 95A has reached room temperature. The cooling rate is in the range of 10~100° C./min., and more preferably in the range of 30~80° C./min. The cooling time t3 is computed in seconds starting when the cooling unit 13 is activated.

Furthermore, when T1, T2, and T3 satisfy the expression shown hereinbelow, the finished porous composite film 95 would achieve a better air permeability and stripping-resistance.

$$T2 > T1 > T3;$$

$$\frac{T1+T2+T3}{100}*W1 = 1;$$

$$\frac{|T2-T1|}{|T3-T1|}*W2 = 1;$$

When 0.2<W1<0.5, a stripping-resistance of greater than 30 g can be achieved, and the time for 100 cc of air to flow through the porous composite film 95 can be kept under 1000 sec. Same conditions can be met when 0.02<W2<16.

Furthermore, the pre-determined tension S3 of the cooling unit 13 increases at a rate of 10~100 kgf/cm², and more preferably at 30~60 kgf/cm², until the cooling process is completed.

To meet the minimum standard for using in lithium batteries as separation film, the porous composite film 95 should have the following properties: a) the puncture-resistance is at least 200 g; b) the tensile strength is at least 700 kgf/cm²; and 3) the air permeation time is in the range of 300~700 sec. for 100 cc of air. To achieve a better air permeability and stripping-resistance, the tension for the pressing unit 11, the film-shaping unit 12, and the cooling unit 13 preferably have the following relationship: S3>S1>S2. For the instant disclosure, the cooling unit 13 utilizes a stepped cooling rate. The reason is to allow the half-finished porous composite film 95A to take shape in a gradual fashion. Thus, proper pore size and uniform pore distribution can be achieved.

After the cooling step has been completed, the manufacturing process of the porous composite film 95 is now finished. The finished porous composite film 95 has a pre-determined tension and a thickness of approximately 30 um. Based on the manufacturing method of the instant disclosure, two porous films are stacked, pressed, and heat-treated to obtain sufficient resistance against puncturing and pores suitably sized for lithium ions to flow therethough. The associated air permeability for 100 cc of air is in the range of 300~700 seconds. The stripping force of the first and second porous films 91, 92 is at least 50 g/cm². These aforementioned properties satisfy the qualification requirement for the separation film inside lithium batteries.

In particular, the two porous films are stacked based on different stretching directions. Then, the pressing unit 11, the film-shaping unit 12, and the cooling unit 13 are utilized to process the stacked films. The final finished product would have enhanced puncture-resistance. When the porous composite film 95 is used as separation film inside lithium batteries, the tensile strength, air permeability, porosity, and stripping resistance all meet the industrial standards.

The descriptions illustrated supra set forth simply the preferred embodiment of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A manufacturing method for a porous composite film having a pre-determined tension, by processing a first porous film and a second porous film, with the first porous film defining and being disposed along a first stretching direction, and the second porous film defining and being disposed along a second stretching direction, comprising the steps of:

providing a pressing unit, a film-shaping unit, and a cooling unit;

arranging the first and the second porous films in a manner that the first stretching direction and the second stretching direction intersect at a predetermined angle;

stacking the first porous film and the second porous film to form a half-finished porous composite film;

pressing the half-finished porous composite film by the pressing unit at a temperature $T1$ under a tension $S1$;

shaping the half-finished porous composite film by the film-shaping unit at a temperature $T2$ for thermally relieving the pressing force against the half-finished porous composite film;

maintaining the half-finished porous composite film at a pre-determined tension $S3$ by the cooling unit at a temperature $T3$, wherein $T3$ satisfying the following condition:

$$\frac{T1+T2+T3}{100} * W1 = 1, \text{ wherein } 0.2 < W1 < 0.5$$

$$\frac{|T2-T1|}{|T3-T1|} * W2 = 1, \text{ wherein } 0.02 < W2 < 16.$$

2. The manufacturing method of a porous composite film of claim 1, wherein the temperature $T1$ is in the range of 60~140° C. and the temperature $T2$ is in the range of 100~160° C.

3. The manufacturing method of a porous composite film of claim 1, wherein $T2-T1=5\sim50°$ C.

4. The manufacturing method of a porous composite film of claim 1, wherein a relieving parameter G is defined by the film-shaping unit and satisfy the following:

$$\left|\left(\frac{T2-T1}{T1+100}*100-5\right)\right|\% \leq G\% \leq \left(\frac{T2-T1}{T1+100}*100+5\right)\%;$$

$$1\% \leq G \leq 32\%.$$

5. The manufacturing method of a porous composite film of claim 1, wherein the pressing unit exerts a pressure P1 in the range of 0.01~0.37 kg/cm² in pressing the first and second porous films.

6. The manufacturing method of a porous composite film of claim 1, wherein the tension S1 is in the range of 10~500 kgf/cm².

7. The manufacturing method of a porous composite film of claim 1, wherein the cooling unit cools the half-finished porous composite film at a rate of 10~100° C./min.

8. The manufacturing method of a porous composite film of claim 1, wherein the tension S3 increases at a rate of 10~100 kgf/cm² per minute.

* * * * *